United States Patent [19]

Spigener

[11] Patent Number: 5,732,800

[45] Date of Patent: Mar. 31, 1998

[54] MECHANICAL ATTACHMENT SYSTEM FOR LOW VOLUME PRODUCTION OF BRAKE PAD ASSEMBLIES

[75] Inventor: Ronald D. Spigener, Prattville, Ala.

[73] Assignee: Brake Parts, Inc., McHenry, Ill.

[21] Appl. No.: 854,114

[22] Filed: May 9, 1997

Related U.S. Application Data

[63] Continuation of Ser. No. 561,375, Nov. 21, 1995, abandoned.

[51] Int. Cl.⁶ ........................... F16D 65/04
[52] U.S. Cl. ..................... 188/234; 188/250 G
[58] Field of Search ................ 188/234, 250 G, 188/250 R, 250 F, 250 D, 250 B, 242–248, 258, 251 R; 29/460, 527.4, 530, 469.5, 505

[56] References Cited

U.S. PATENT DOCUMENTS 3,343,770  9/1967  Szonn .................. 188/250 G X

FOREIGN PATENT DOCUMENTS 155935  12/1980  Japan .................... 188/250 G

Primary Examiner—Peter M. Poon
Attorney, Agent, or Firm—St. Onge Steward Johnston & Reens

[57] ABSTRACT

A brake pad assembly is provided comprising a backing plate, a plurality of metal channel members having side walls upwardly extending from a base, the channel members attached to the backing plate, friction material molded onto the backing plate over the channel members, whereby the side walls of the channel members are bent inward under the molding pressure to mechanically lock the friction material in place on the backing plate. Methods of making the brake pad assembly are also disclosed.

11 Claims, 3 Drawing Sheets

MECHANICAL ATTACHMENT SYSTEM FOR LOW VOLUME PRODUCTION OF BRAKE PAD ASSEMBLIES

This is a continuation of application Ser. No. 08/561,375 filed on Nov. 21, 1995 now abandoned.

FIELD OF THE INVENTION

The invention relates to a mechanical attachment system for bonding a disc pad to a backing plate in a brake pad assembly, and more specifically to a mechanical attachment system for use with backing plates having a nonstandard size or shape, such as those used in race cars, where production volume is low.

BACKGROUND OF THE INVENTION

Mechanical attachment systems for bonding the disc pad to the backing plate in brake pad assemblies are known in the art. Many prior art systems employ such automated operations as punching, drilling, die cutting and stamping to create a mechanical bond. All of these automated methods utilize dies or machining configurations which are dependent upon the size and shape of the backing plate to which the disc pad is to be bonded and, therefore, require extensive lead time and retooling each time a new size or shape backing plate is used. Other prior art systems employ methods such as brazing or sintering, operations which are costly in themselves and often require heat treating of the backing plate. The expenditure of time and capital in all of the prior art methods can be justified only when production volume is high and relatively long lead times are available.

U.S. Pat. No. 1,225,555 discloses a system for fastening web brake shoes to brake shoe heads. A number of metallic fasteners are bolted to the brake shoe heads. These fasteners each contain several prongs which are bent slightly outward. The prongs are forced into the web brake shoe which causes the prongs to spread, thereby securing the brake shoe. A disadvantage of this prior art system is that the fasteners used to hold the brake shoe in place are relatively complicated and must be machined before this system can be used. Another disadvantage of this system is that each fastener must be individually bolted to the brake shoe heads, a relatively time consuming process. A further disadvantage is that this fastening method was designed specifically for use with a web style brake shoe and may not be compatible with modern friction materials.

U.S. Pat. Nos. 1,336,752, 4,569,424 and 5,141,083 disclose systems for fastening friction material to the backing plate by punching or drilling holes in the backing plate to create protrusions on the face of the plate. In the '752 patent holes are punched in a thin metal plate causing prongs to penetrate into the preformed brake lining, thereby securing the lining to the plate. The '424 patent is similar; the difference being that perforations which form protruding tabs are punched before the friction material is cast directly onto the liner plate. In the '083 patent holes are drilled through the backing plate and flared flanges are created before the friction material is molded onto the backing plate. A disadvantage of these systems is the capital cost. In the above fastening methods a new die must be created each time a new size or shape backing plate is used, thereby greatly increasing preparation expenses.

U.S. Pat. No. 4,799,579 discloses a bonding system in which metal particles (e.g., chips, shavings, kinked or bent wire sections, deformed brush-like metal bristles, corrugated hardware cloth, or metal fibers) are brazed to the backing plate before the friction material is molded onto it. A disadvantage of this method is that brazing the metal particles to the backing plate may have adverse effects on the plate itself. The steel backing plate may become softened and/or lose its flatness during the process, thus requiring the additional expense of heat-treating and/or restraightening the backing plate.

U.S. Pat. No. 5,358,684 discloses a system for bonding friction material to the backing plate whereby a mounting bed is sinter-fused onto the backing plate before friction material is molded onto it. The mounting bed consists of a series of individually shaped members (e.g., cylinders, cones, pyramids) created in a graphite mold. A disadvantage of this method is that the graphite molds used to create the mounting bed must necessarily vary with the size and shape of the backing plate. A new mold must be created each time a backing plate with a different size or shape is to be used. Another disadvantage of this method is that sintering is expensive, time consuming, and can soften the steel backing plate, thus requiring heat-treating of the plate.

U.S. Pat. Nos. 5,123,514 and 5,355,986 disclose another attachment system for brake assemblies. In both patents, a lamina (sometimes called a carrier) is produced by stamping from sheet metal a shape corresponding to the shape of the backing plate. Holes are then punched in a gridlike configuration, the edges of each being flanged upward so that they may be embedded into the friction material, and the lamina is attached to the backing plate. A disadvantage of this prior art is the capital cost. Since the size and shape of the lamina corresponds to the individual backing plate being used, a new stamp die must be created for each size and shape backing plate.

U.S. Pat. Nos. 4,924,583 and 4,991,697 disclose a system for attaching friction material to the backing plate in a disc brake assembly using expanded metal mesh as a bonding reinforcement. This type of prior art involves precutting a template and then stamping a form from a sheet of mesh to the approximate size and shape of the backing plate. The stamped form is then attached to the backing plate using a spot welder. A disadvantage of this attachment method is that a new template must be produced to correspond with each backing plate. Another disadvantage of this method is that the mesh intersections and welder heads must match precisely. Both of these disadvantages lead to extremely high tooling costs. A further disadvantage of this method is that the metal mesh comprises a large portion of the disc pad surface area and thus reduces the useful life of the pad.

Referring to FIGS. 1 and 2, prior art brake pad assemblies 110, 210 for high performance applications employ metal structures such as expanded metal mesh 12 or stamped plates 14 which are normally welded (as indicated at points 17) to a backing plate 116, 216. High volume production of prior art assemblies 110, 210 requires a tool, die and/or stamp (not shown) for cutting and or stamping the metal structure so that its outline 111, 211 substantially matches a peripheral shape 113, 213 and the surface area of backing plate 116, 216. Mesh 12 and plate 14 both include holes or hollow regions 15 so that pad material can be molded in and around mesh 12 and plate 14 to mechanically attach a pad to the backing plate 116, 216. For prior art attachment structures such as plate 14 the tool, die and/or stamp is often also used to create holes 15.

Welding prior art attachment structures 12, 14 requires careful registration of weld points 17 so as to avoid holes 15. The necessary careful alignment of weld points further increases the time and expense of manufacturing prior art assemblies 110, 210. The time and cost of creating tools/ dies/stamps and registering/aligning weld points makes these prior art systems cost prohibitive for low volume production. Another disadvantage is that these prior art assemblies are not capable of rapid turn around times since each different size or shape of backing plate will require new tooling and weld position programming.

What is desired, therefore, is a mechanical attachment system for bonding friction material to the backing plate in brake pad assemblies which requires short lead times and preparation expenses and which can be easily and economically adapted to backing plates of nonstandard sizes and shapes.

SUMMARY OF THE INVENTION

Accordingly, it is an object of the invention to provide a mechanical attachment system to bond a disc pad to a steel backing plate in brake pad assemblies.

Another object of the invention is to provide a mechanical attachment system which can be quickly and easily adapted to differently sized and shaped brake pad assemblies at low cost.

A further object of the invention is to provide a mechanical attachment system of the above character which allows for the economical manufacture of short production runs of brake pad assemblies.

Still another object of the invention is to provide a mechanical attachment system of the above character which uses channel members made of soft metal which mechanically lock the disc pad in place while comprising a small portion of the total disc pad surface area.

Yet another object of the invention is to provide a mechanical attachment system of the above character which uses spot welding as the means for attaching the channel members to the backing plate.

Yet a further object of the invention is to provide a mechanical attachment system of the above character which uses metal "U"-shaped forms of a standard size and shape which require no tooling and are readily available at a low cost.

Still another object of the invention is to provide a mechanical attachment system of the above character which may be used with both preform and loose fill methods of molding disc pads.

These and other objects are achieved by provision of a mechanical attachment system for mounting a disc pad to a steel backing plate in brake pad assemblies, the attachment system comprising a plurality of metal channel members having a base and arm extending from the base, the members being spot welded to a nonstandard steel backing plate, the arms being bent inwardly during the molding of friction material to the backing plate to mechanically lock the molded friction material in place on the backing plate.

Preferably, the channel members are standard in size and shape, with one size being used for any size disc pad, thus requiring no added tooling costs. The upright legs of the metal forms preferably bend slightly inward during molding, thereby locking the friction material securely to the backing plate. Preferably, each channel member is spot welded to the backing plate in two places on its base. Adhesive bonding is preferably used in addition to the mechanical attachment method described herein in order to reinforce the bonding.

In another aspect, the invention relates to a method of mechanically attaching a disc pad to a backing plate in brake pad assemblies comprising the steps of providing a backing plate having a nonstandard size or shape, spot welding a plurality of metal forms on a face of the backing plate, molding friction material onto the face of the backing plate which contains the metal forms, and bending arm members extending from the base of the metal forms with the molding pressure to mechanically lock the molded friction material in place on the backing plate.

The invention and its particular features and advantages will become more apparent from the following detailed description considered with reference to the accompanying drawings.

DETAILED DESCRIPTION OF THE INVENTION

Figure 1:
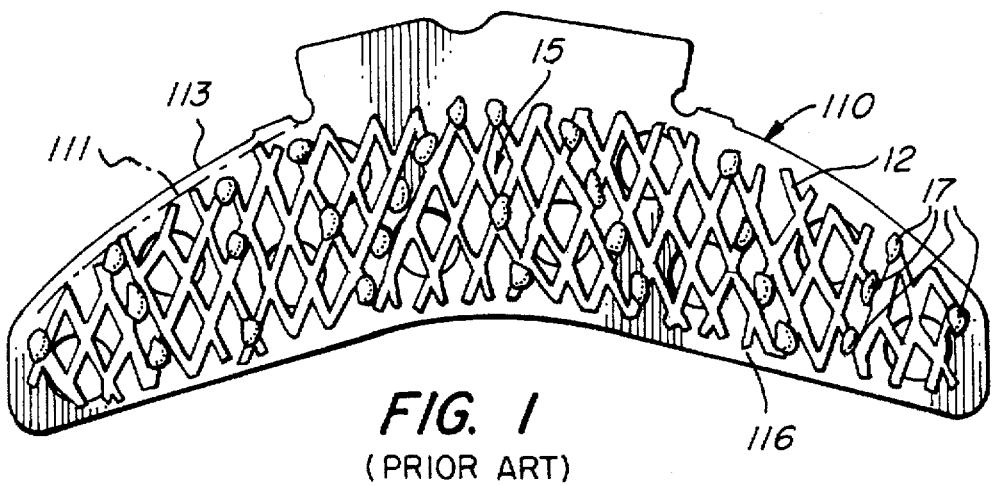
FIG. 1 is a top view of a prior art backing plate with a metal mesh attachment structure cut to fit the backing plate welded in place thereon.
Figure 2:
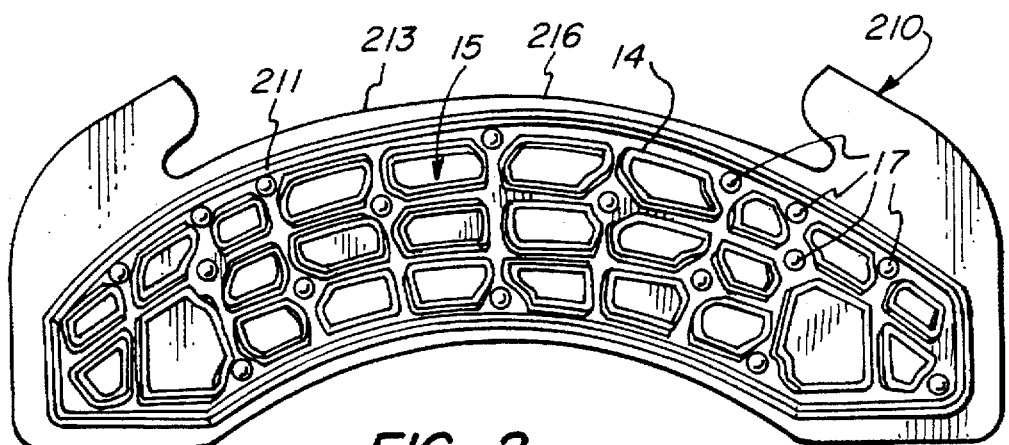
FIG. 2 is a top view of a prior art backing plate showing a stamped form attachment structure cut to fit the backing plate welded in place thereon.

Referring to FIGS. 3–7, brake pad assembly 10,10' of the invention provides a high-performance mechanical lock of friction material 18, to backing plate 16,16' suitable for high performance applications at low cost and with short lead times for any size or shape of backing plate. Assembly 10 is manufactured without a tool/die/stamp and without need to register/align weld points so they miss holes in the attachment structure.

Brake pad assembly 10,10' comprises friction material 18 disposed over a backing plate 16,16' to which metal channel members 20 have been attached by spot welding at points 17. Each channel member includes a base 22 and two side walls 24 extending from base 22. A surface area of base 22 is very much smaller than the surface area of plates 16,16'. The metal channel members are made from approximately 1 inch long by ½ to 1 inch wide by 0.020 inch thick sheet metal, and when first attached to backing plate 16,16' are substantially "U"-shaped with walls 24 bent slightly inwardly. Side walls 24 are about ¼ inch high and the base 22 is about ½ to ¾ inches in width. It is understood that channel members having other dimensions will work equally well. The dimensions provided are those of a readily available and inexpensive source of channel members, the clips used to secure metal bands on large boxes and pallets.

Any number of such channel members can be used, however, it has been found that a minimum of 1 per 5 square inches of pad area is suitable for high performance applications. It is understood, however, that the number of channel members necessary to retain the friction material will also depend upon the size of channel member walls 24 since it is this surface area which provides the mechanical attachment.

Although other methods are possible, channel members 20 are attached to the backing plate 16,16' by spot welds 17 which are strong yet relatively quick and inexpensive. Spot welding is particularly suited to attachment of channel members 20. Their location on backing plate 16, 16' is not critical and thus alignment of the weld locations is not critical. Methods such as rivets or other connectors may be used but require a drilling step or other preparation of the backing plate in addition to the added cost of the connectors.

Figure 3:
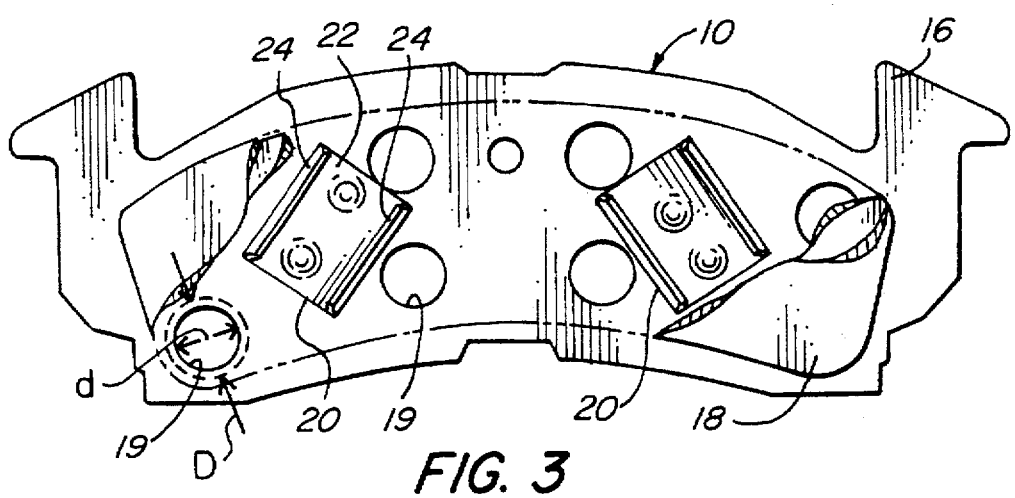
FIG. 3 is a top plan view of the brake pad assembly of the invention with the friction material partially cut away to reveal the metal channel member attachment structures spot welded to the face of a backing plate.

As shown in FIG. 3, the backing plate 16,16' may include through holes 19, also known as I.M. holes, to aid in the attachment of friction material 18. It is understood, however, that I.M. holes are not necessary in order to obtain the advantages of the invention. If the backing plate 16,16' does include through holes, 19, preferably the diameter d on the face 26,26' of backing plate 16.16' is less than diameter D on the back surface of the backing plate 16,16' to provide an additional mechanical locking of friction material 18 to backing plate 16,16'.

Figure 4:
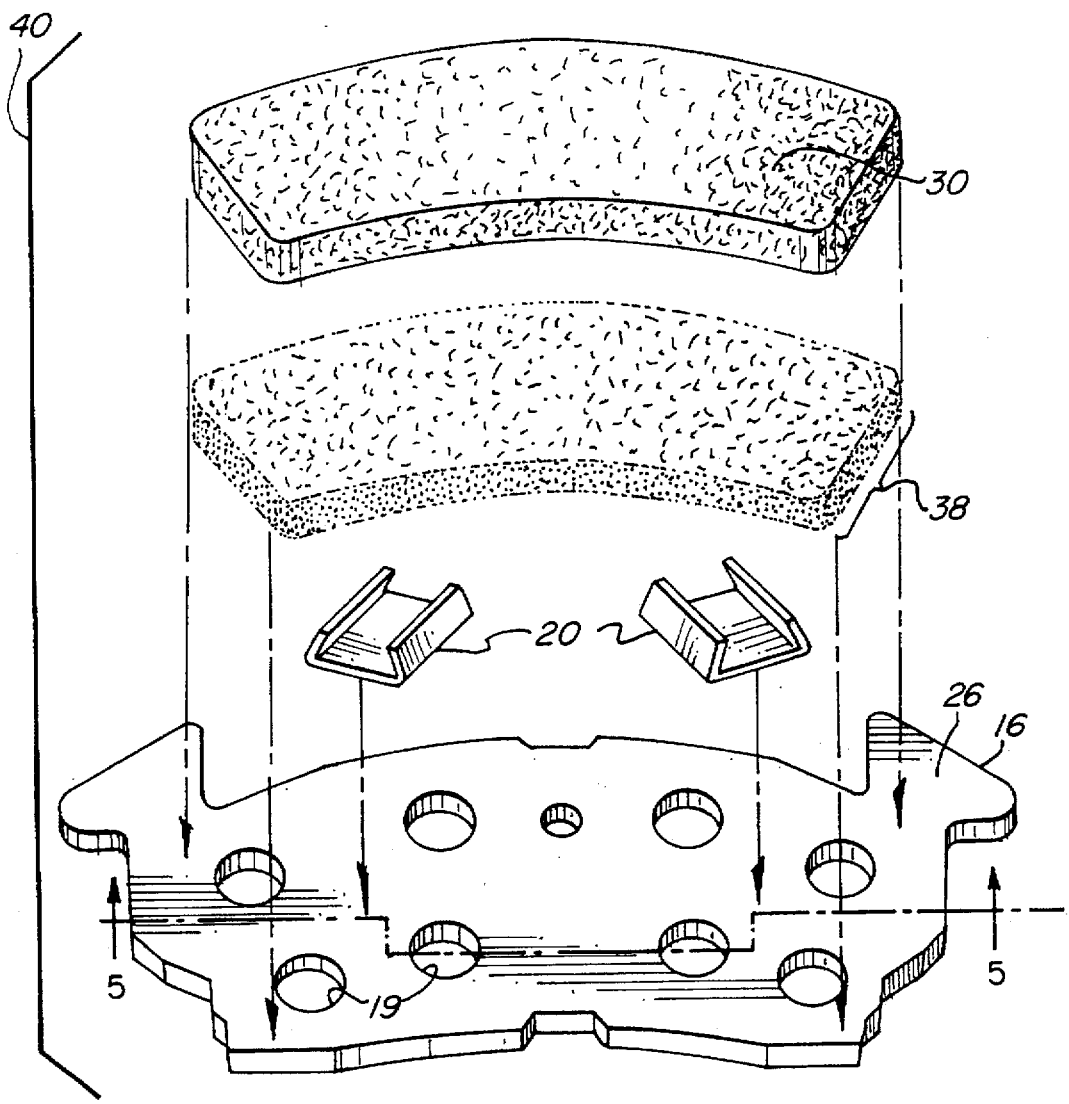
FIG. 4 is an exploded view of the brake pad assembly of FIG. 3 illustrating one embodiment of a method for making the assembly with a combination of preformed and loose-fill friction material.

In another aspect, the invention provides a method of making brake pad assembly 10. FIG. 4 schematically depicts one embodiment 40 of a method for making brake pad assembly 10. After attachment of channel members 20 to face 26 of backing plate 16, a first layer 28 of loose-fill friction material and/or other suitable material such as "backing stock" material is disposed over face 26 and channel members 20. A second layer 30 of preformed friction material may then be disposed over the first layer 28. As discussed above, the backing plate may include through holes 19 to aid in the securement of the friction material. Layers 28 and 30 are then pressure molded into a single monolithic pad of friction material 18.

Figure 5:
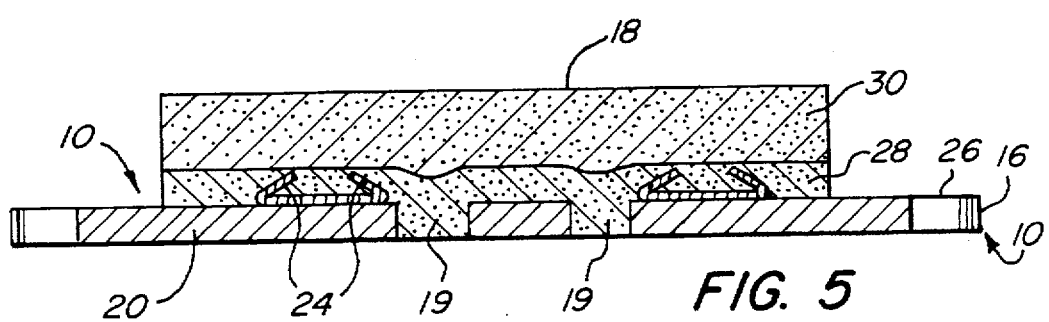
FIG. 5 is a cross-sectional, side elevation view of the brake pad assembly of FIG. 3 taken along line 5—5 of FIG. 4 showing the final molded position of the side walls of the channel members, and the relative amounts of loose-fill and preform material which compose the final assembly.

Referring to FIG. 5, the pressure created by the step of molding first and second layers 28, 30 of friction material onto backing plate 16 causes the side walls 26 of the channel members 20 to bend inwardly around some of the friction material, thereby locking pad 18 in place with the inner surfaces of said walls. If desired, a layer of adhesive (not shown) may be disposed on face 26 of the backing plate 16 to provide an additional bond. It is understood that the extent to which walls 24 bend during molding will depend upon the thickness and strength of the material from which channel members 20 are made as well as the degree to which the walls were bent inwardly prior to molding. Some bending is necessary to securely attach pad 18 and preferably at least some of this bending occurs during molding although it may be all prebend.

Figure 6:
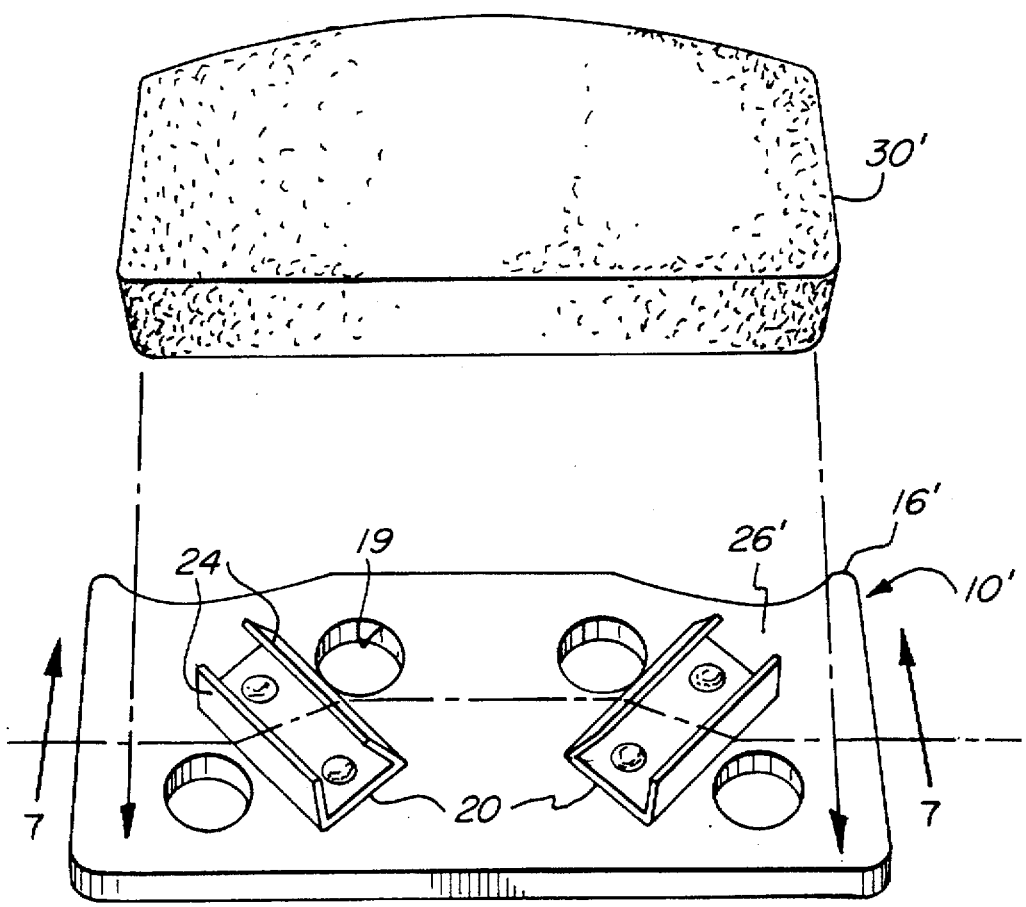
FIG. 6 is an exploded view of the brake pad assembly of FIG. 3 illustrating another embodiment of the method for making the assembly with only preformed friction material.
Figure 7:
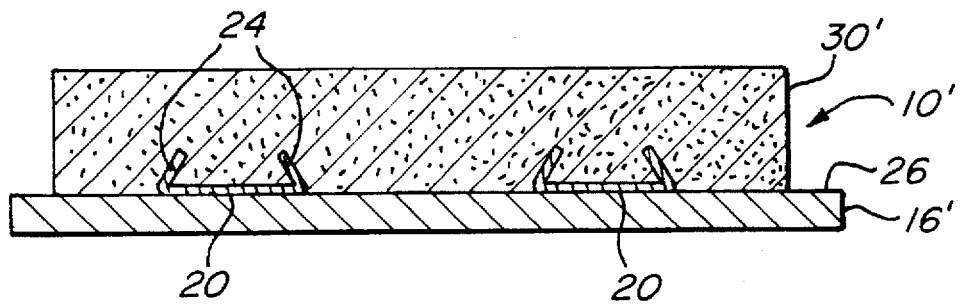
FIG. 7 is a cross-sectional, side elevation view of the brake pad assembly of FIG. 3 taken along line 7—7 of FIG. 6 showing the final molded position of the side walls of the channel members bent inwardly around some of the friction material.

Referring now to FIG. 6 another embodiment 42 of a method for making brake pad assembly 10' is schematically depicted. Assembly 10' differs from assembly 10 only in that assembly 10' utilizes a different size and shape backing plate 16' than backing plate 16 of assembly 10, illustrating that channel members 20 may be relatively quickly, easily, inexpensively and economically used to prepare high performance brake pad assemblies in low volumes from virtually any size and shape backing plate. In this regard, it is understood that either method 46,42 may be used to make either assembly 10,10' or those having virtually any size or shape backing plate.

After attachment of channel members 20 to backing plate face 26, a single layer 30' of preformed friction material may be disposed over face 26 and channel members 20 for molding to form a pad of friction material 18. Single layer preform 30' of friction material may need to be thicker than the preform 30 used in other embodiments of the method which include multiple layers of material above the backing plate 16,16'. Method 40 is generally preferable for use when channel members 20 are made from unusually thin material and/or when preform 30 is unusually stiff since loose fill layer 28 aids to prevent preform 30 from bending walls 26 of channel member 20 flat against base 24, and thus adds to ensure mechanical attachment of pad 18 to backing plate 16.

Conversely, method 42 may be used whenever the combination of preform 30' stiffness and channel member arm 26 strength is such that the channel member arms can punch into preform 30' without bending flat prior to molding—whether arms 24 are bent slightly inward or not.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A brake pad assembly for efficient low volume production, which comprises:

a backing plate having a plate surface area;

at least one channel member having a base and two side walls extending from said base, said side walls having open ends and an edge extending substantially along the length of each said side wall, said edges being substantially parallel to one another, and said base having a surface area substantially smaller than said surface area of said backing plate;

a spot weld for attaching said channel member to said backing plate; and a brake pad molded to said backing plate, said side walls of said channel member bent inwardly toward each other during molding to mechanically lock said brake pad to said backing plate.

2. The brake pad assembly of claim 1, wherein said backing plate includes at least one hole for receiving said brake pad to aid in securing said brake pad to said backing plate.

3. The brake pad assembly of claim 1, further comprising a layer of adhesive between said backing plate and said brake pad to reinforce the mechanical attachment produced by said channel member.

4. The brake pad assembly of claim 1, wherein said channel member comprises a preformed banding clip.

5. A brake pad assembly for efficient low volume production, which comprises:

a backing plate having a plate surface area;

at least one banding clip having a base and two side walls with open ends extending from said base in substantially U-shaped configuration;

a spot weld for attaching said banding clip to said backing plate; and a brake pad molded to said backing plate, said side walls of said banding clip bent inwardly toward each other during molding to mechanically lock said brake pad to said backing plate.

6. The brake pad assembly of claim 5, wherein said backing plate includes at least one hole for receiving said brake pad to aid in securing said brake pad to said backing plate.

7. The brake pad assembly of claim 5, further comprising a layer of adhesive between said backing plate and said brake pad to reinforce the mechanical attachment produced by said banding clip.

8. A method for making a brake pad assembly, which comprises the steps of:

providing a first nonstandard backing plate;

providing at least one channel member having a base and two side walls with open ends extending from said base, said side walls each having an edge substantially parallel to one another;

spot welding said base of said channel member to said first backing plate;

molding friction material into a monolithic pad; and bending said side walls of said channel member slightly inward toward each other during molding to mechanically attach said pad to said first backing plate.

9. The method of claim 8, further comprising the steps of:

providing a second nonstandard backing plate different than said first backing plate;

spot welding said channel member to said second backing plate;

molding friction material into a second monolithic pad; and bending said side walls of said channel member slightly inward toward each other during molding to mechanically attach said second pad to said second backing plate.

10. The method of claim 8, further comprising the step of applying adhesive to said first backing plate prior to molding to reinforce the mechanical attachment produced by said channel member.

11. The method of claim 8, which further comprises, prior to molding, the steps of:

providing a preformed friction material; and disposing said preformed material on said friction material.

* * * * *